AIRCRAFT ARRESTING SYSTEM

Original Filed Nov. 12, 1958 6 Sheets-Sheet 1

*INVENTORS*
JOHN J. BYRNE & ROBERT W. CRUGER
*BY* Williams & Tilbury
ATTORNEYS

AIRCRAFT ARRESTING SYSTEM

Original Filed Nov. 12, 1958 6 Sheets-Sheet 2

INVENTORS
JOHN J. BYRNE & ROBERT W. CRUGER
BY Williams & Filberry
ATTORNEYS

AIRCRAFT ARRESTING SYSTEM

Original Filed Nov. 12, 1958 6 Sheets-Sheet 3

INVENTORS
JOHN J. BYRNE & ROBERT W. CRUGER
BY Williams & Albery
ATTORNEYS

INVENTORS
JOHN J. BYRNE & ROBERT W. CRUGER
BY
Williams & Gilbert
ATTORNEYS

AIRCRAFT ARRESTING SYSTEM

Original Filed Nov. 12, 1958 6 Sheets-Sheet 5

INVENTORS
JOHN J. BYRNE & ROBERT W. CRUGER
BY
Williams & Albery
ATTORNEYS

AIRCRAFT ARRESTING SYSTEM

Original Filed Nov. 12, 1958 6 Sheets-Sheet 6

*INVENTORS*
JOHN J. BYRNE &
ROBERT W. CRUGER
BY Williams & Albury
ATTORNEYS

United States Patent Office

Re. 25,406
Reissued June 25, 1963

25,406

AIRCRAFT ARRESTING SYSTEM

John J. Byrne, Canton, Ohio, and Robert W. Cruger, Drexel Hill, Pa., assignors to E. W. Bliss Company, Canton, Ohio, a corporation of Delaware Original No. 2,977,076, dated Mar. 28, 1961, Ser. No. 773,220, Nov. 12, 1958. Application for reissue July 20, 1962, Ser. No. 212,186
9 Claims. (Cl. 244—110)

Matter enclosed in heavy brackets [ ] appears in the original patent but forms no part of this reissue specification; matter printed in italics indicates the additions made by reissue.

This invention relates to means for arresting the forward motion of aircraft while landing, and in particular to improvements designed to increase the capacity of arresting gear to function safely and arrest aircraft at higher aircraft engagement speeds.

Until the advent of jet propelled aircraft, propeller-driven aircraft normally landed at such relatively low speeds as not to overtax the engaging speed capacity of known arresting gear systems. However, with the development of the faster jet type aircraft, landing speeds have continued to increase until the engaging speed capacity of conventional type arresting equipment has been reached. For instance, propeller-driven craft could be expected to land at speeds between 40 and 70 miles an hour, whereas jet aircraft now are landing at speeds of up to 200 miles an hour, and it is not unrealistic to expect that these landing speeds will continue to increase as improvements in aircraft continue to be made.

It is, therefore, among the objects of this invention to provide improvements in conventional arresting gear means wherein safe arrestment of aircraft can be made at landing speeds substantially greater than is now possible with existing equipment. It is an additional object of this invention to provide aircraft arresting equipment in which woven tape of synthetic fibers is employed to contribute favorable dynamic characteristics to the arresting gear system. It is yet another object of this invention to provide for use in arresting gear equipment an article of manufacture comprising novel, improved tape woven from synthetic fibers, which makes possible the employment of arresting gear having a capacity to arrest aircraft landing at greater speeds than heretofore possible.

The features of this invention, which are believed to be novel, are set forth with particularity in the appended claims. The invention itself, however, both as to its organization and use, together with further objects and advantages thereof, may best be understood by reference to the following description taken in conjunction with accompanying drawings, in which:

Figure 1:
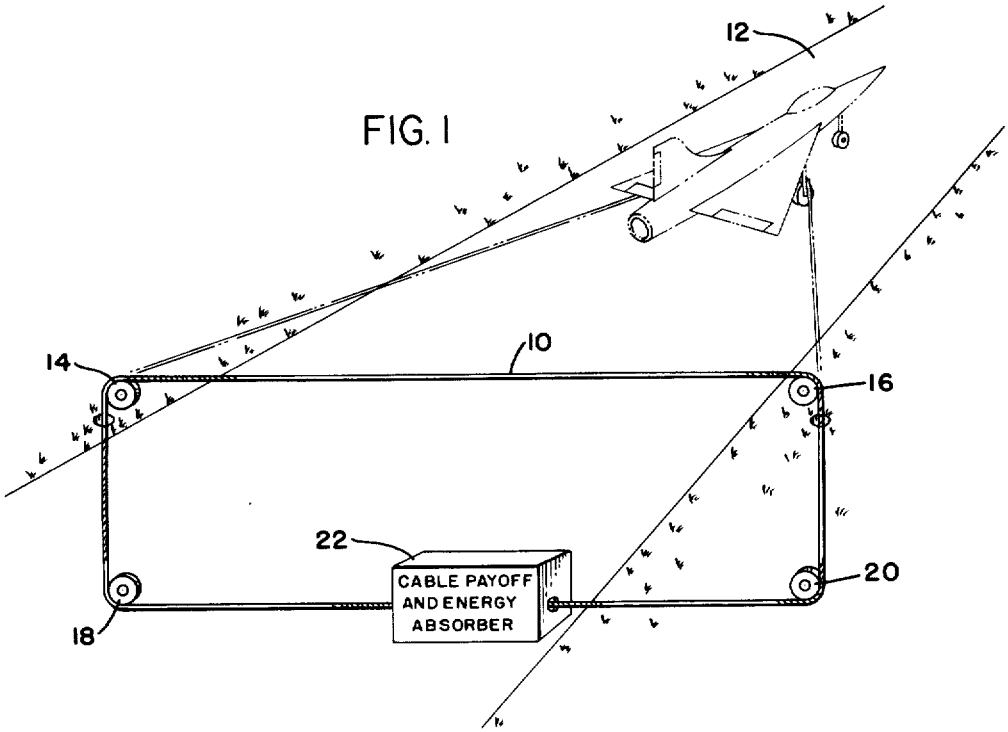
FIGURE 1 is a schematic diagram of the general organization of prior art aircraft arresting equipment.

The general organization of aircraft arresting gear presently in use (see FIGURE 1) includes a pendant or other engaging means 10 stretched transversely across an aircraft landing runway 12. The pendant is usually a steel cable so employed because of its high strength and its satisfactory resistance to abrasion, water, the influence of weather, climate, and the like. It is customary to pass a cable, the ends of which are connected to the pendant or engaging means, around sheaves 14 and 16 which are stationed on opposite sides of the runway to position the cable transversely thereto. The cable is of sufficient length that after passing about sheaves 14 and 16 and, when necessary, sheaves 18 and 20, it extends to an energy absorber 22 of any prior art design positioned to one side of, or, alternatively, beneath the runway. The ends of the cable are fastened to a cable payout means, not shown, which, in co-operative association with energy absorber 22, provides controlled resistance to the aircraft after it has engaged the steel cable so as to bring the aircraft to a gradual stop.

Figure 3:
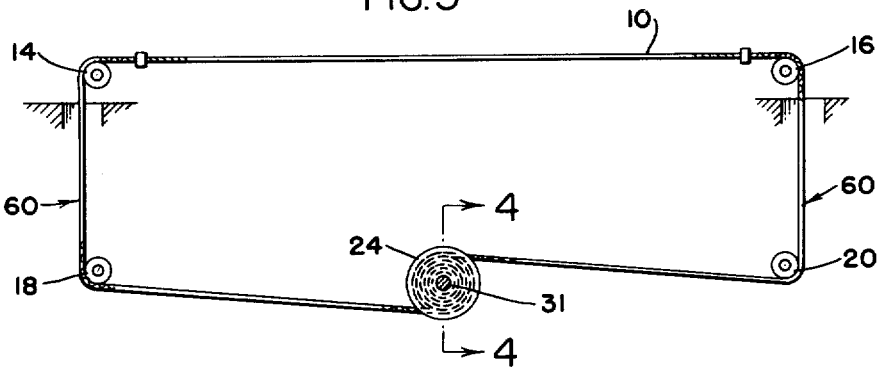
FIGURE 3 is a schematic diagram partially in section of a specific type of arresting gear toward which the subject improved is directed.
Figure 4:
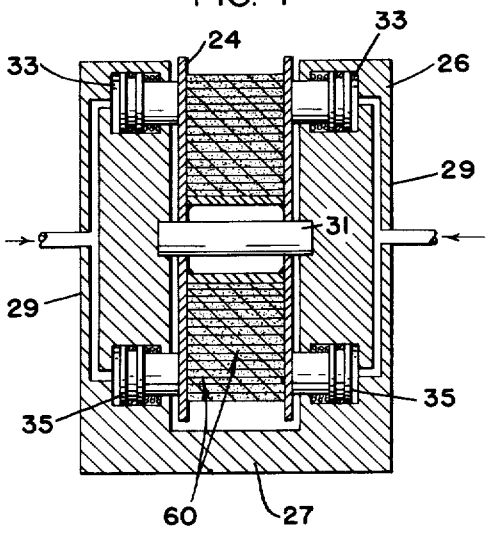
FIGURE 4 is a sectional view taken on the line 4—4 of FIGURE 3.
Figure 5:
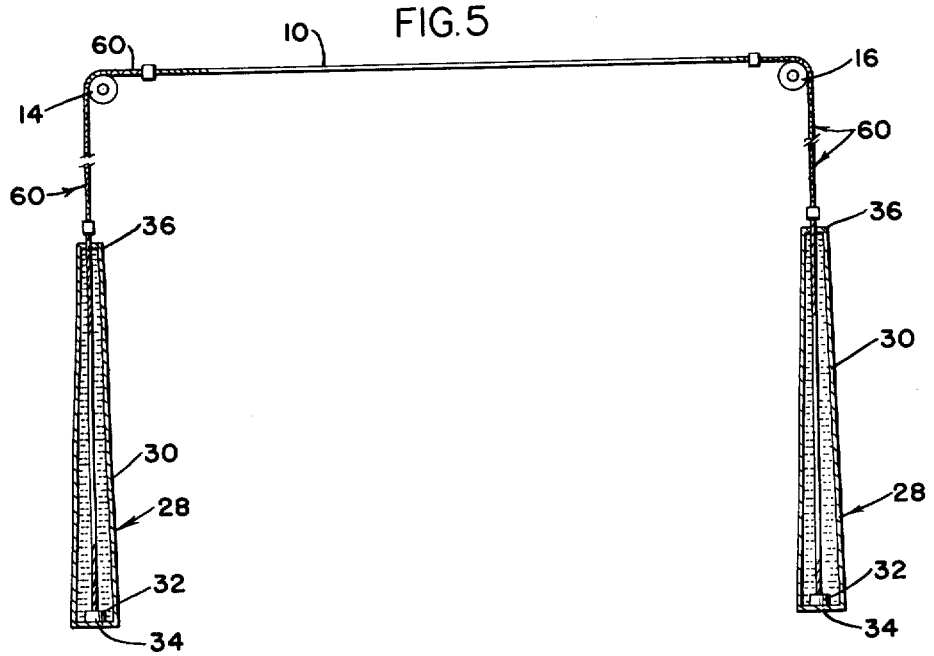
FIGURE 5 is a schematic diagram partially in section of yet another specific type of arresting gear partially in section toward which the subject invention is directed.

By way of further illustration, the payout means may comprise a reel 24 (see FIGURE 3) on which the cable is wound so as to provide payout both to the right and to the left when the pendant 10 is engaged by the aircraft. Secured to the reel are brake means 26 (see FIGURE 4) which retard the rotation of the reel 24 so as to prevent the cable 10 from paying out too rapidly. The brake means illustrated include a base 27; upstanding side members 29 adapted to journal reel 24 on shaft 31; cylinder means 33 in side members 29; and piston means 35 adapted to make frictional braking engagement with the sides of reel 24.

Yet another embodiment of an aircraft arresting system comprises a pendant fastened at opposite ends to so-called "water squeezers" 28. The basic idea of the "water squeezer" is to provide a conically shaped water-tight housing 30 in which is positioned a piston 32 to which is secured one end of the aircraft arresting means. The housing is filled with water and, as an aircraft engages the pendant, the piston 32 is drawn from the base 34 of the cone towards its truncated apex 36 thereby forcing water to be metered between the piston and the walls of the housing. As the piston progresses from the base end 34 to the apex end 36 of the housing 30, the space between the piston and the housing becomes progressively less, thereby increasing the resistance to the passage of water from the apex end of the housing to the base end. This is a simple application of the common hydraulic dash pot or buffer.

Irrespective of the energy absorbing system employed, the engaging velocity limitation of all of these and similar systems is a function of the strength of the steel cable used in the systems, its modulus of elasticity and speed of sound. Otherwise stated, there is an upper limit to the longitudinal stress which can be applied to a steel cable in excess of which the cable will fail in tension. This upper limit condition can be expressed by the equation $$S=\frac{EV}{C}$$

where S equals the stress in p.s.i.; E is the modulus of elasticity of the cable in p.s.i.; V is the longitudinal velocity component of impact on the cable in f.p.s.; and C is the speed of sound in the cable in f.p.s. An accepted modulus of elasticity for steel cable is 12 million p.s.i., having a C value of 10 thousand f.p.s. and an ultimate tensile strength or maximum stress value of 240 thousand p.s.i. Substituting these values in the equation, it will be seen that the maximum longitudinal velocity of impact sustainable by the cable cannot exceed 200 f.p.s.

The reason for this limitation, although complex, is well understood by those familiar with the dynamic physical properties of steel cable. It will be readily recognized that a pendant stretched across the runway of an aircraft landing strip or aircraft carrier deck engaged by an aircraft must either instantaneously accelerate from zero to the speed of the aircraft or fail in tension. There is a finite time before the stress wave front, traveling at the speed of sound can reach and actuate the payout mechanism and provide the necessary extra cable to the center span demanded by the movement of the aircraft down the runway. Instantaneously upon engagement by the aircraft the cable will be strained locally at the point of impact and subsequently along its length as the longitudinal wave front moves to provide the additional needed cable until the system gets into motion. Thus, it must either be susceptible to continuous stretching (strain) at some rate in f.p.s. until the system physically moves to provide the feed-in or the arresting gear system must fail.

We have discovered, however, and completely proven by full scale tests that by introducing a medium in the arresting gear system having a modulus of elasticity much lower than that of the steel cable, the requirement for strain at a given rate in the system can be supplied by this new medium while at the same time greatly reducing the stress in the system. Otherwise stated, when an aircraft engages a steel cable type pendant, the requirement for stretch continues until the payout system can be set into motion; but the system is indifferent to the source of available stretch so long as the necessary rate is maintained. Therefore, by interposing an element having a low modulus of elasticity between the pendant and the energy absorber, the high initial stress in the pendant itself and in the entire system is alleviated.

By way of further illustration, analysis of the dynamics of a pendant subjected to a sudden impact velocity will now be considered. In addition to the initial longitudinal stress wave initiated in the pendant by the impact, which in this case is along the axis of the pendant, transverse waves develop which move outwardly along the pendant from the point of impact by the aircraft to the runway edge sheaves from where they are reflected back to the point of impact. This phenomenon has been observed by most every schoolchild playing with a skipping rope or clothes line. The transverse wave in the pendant is the same species as that observed in a clothes line of which one end is fastened and the free end is given a quick whipping movement. When the transverse waves reach the original point of impact at the aircraft pendant intercepting gear they are once more reflected outwardly toward the sheaves. Each transverse wave reflection creates an additional quantum of longitudinal stress additive to the initial impact stress. Finally the cycles of transverse wave reflections are repeated until either the payout system is set into motion, or the maximum permissible longitudinal stress of the cable is exceeded.

Figure 7:
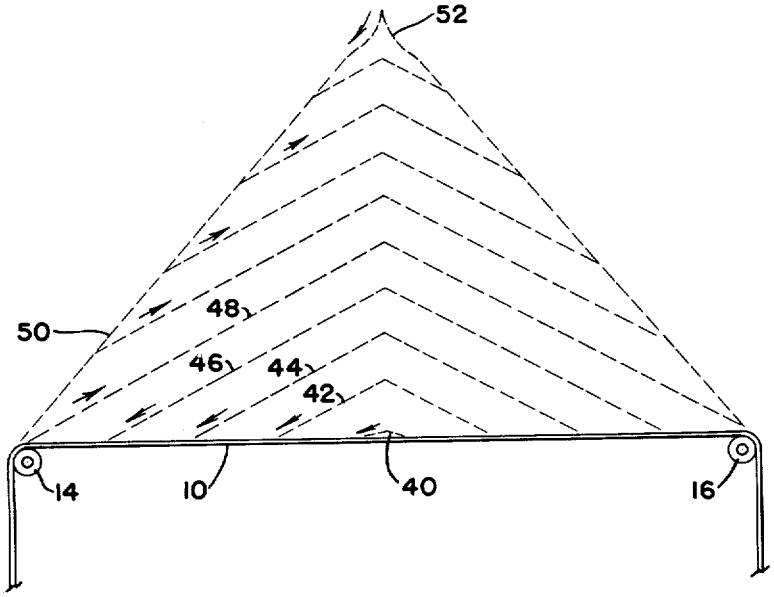
FIGURE 7 is a schematic representation of the progressive configurations of an aircraft arresting pendant following impact by an aircraft.

Reference is now made to FIGURE 7, which shows in simplified schematic form the positions of pendant 10 at selected time increments after impact by an aircraft with the pendant. At the instance of impact between the pendant 10 and the aircraft, a small V 40 is formed in the cable which is the start of a longitudinal stress wave traveling down the cable at the speed of sound C (the speed of sound being the function of the square root of the modulus of elasticity of the cable divided by its density d, or $$C=\sqrt{\frac{E}{d}}$$

After initial impact, the V configuration 40 in the cable moves outward from the point of impact, progressively producing a transverse wave motion in the cable as shown by the broken lines 42, 44, 46, and 48. When the wave 40 reaches wave reflecting media such as the sheaves 14 and 16, an impact occurs between the pendant 10 and these sheaves creating additional longitudinal stresses in the pendant and reflecting the waves back toward the center of the pendant. Because of the relatively high speed of the transverse wave, this impact with the sheave will produce a strain about twice the initial impact. The return of wave 40 from sheave 14 is indicated at position 50. If the tension in the cable is not relieved at this time, a new wave is started at the center of the cable as at 52 which moves outwardly again toward the sheave at an even greater speed because of its higher stress, thus starting the cycle over again, but at an accelerated rate.

In view of the foregoing, we propose to provide means in an arresting system to adequately relieve the stress on the pendant 10 before it can be increased by a first wave reflection 50, at the sheave 14, in addition to causing the transverse velocity impact with the sheave to occur between the provided means and the sheave producing a much lower stress than would occur on a steel wire rope. We accomplish this by securing to the ends 56 and 58 of the pendant (see FIGURE 2) a tape 60 woven of synthetic fibers which extends from the pendant ends, passes over runway or deck edge sheaves 14 and 16 and intermediate sheaves 18 and 20, and continues to make engagement with the energy absorbing means 22. With drawn nylon tape, having a modulus of elasticity of about 300 thousand pounds per square inch, the demand set up in the pendant for stretch, although first supplied by the pendant itself, is transmitted by longitudinal stress waves to the nylon tape before the transverse waves, which travel at less than one-tenth the longitudinal wave speed, reach the sheaves 14 and 16, thereby reducing the stress in the pendant, the speed of the transverse wave and subsequent stresses resulting from impact of the wave with the sheaves, etc. Since the modulus of elasticity of nylon is appreciably lower than that of the steel cable, the demanded rate of stretch per second can easily be supplied by the nylon tape without putting any appreciable stress on the pendant. Thus, the nylon tape provides substantially all of the necessary stretch in the system while at the same time transmitting a longitudinal stress wave to the energy absorbing system to place the payout system into motion before the maximum stress capacity of the nylon tape is exceeded. Thus, referring once again to our basic equation, $$S=\frac{EV}{C}$$

with nylon having a maximum stress capacity of 50,000 p.s.i., a modulus of elasticity of 300,000 p.s.i., and a longitudinal stress wave speed at 5,000 f.p.s., the maximum allowable longitudinal impact velocity is increased from 200 f.p.s. to approximately 833 f.p.s. It is selfevident that this is an appreciable increase in high-speed capacity made immediately available to the arresting systems, and thereby permitting aircraft to be arrested at proportionately far greater speeds than have been possible with the all-steel cable pendant-type systems presently in use.

Figure 2:
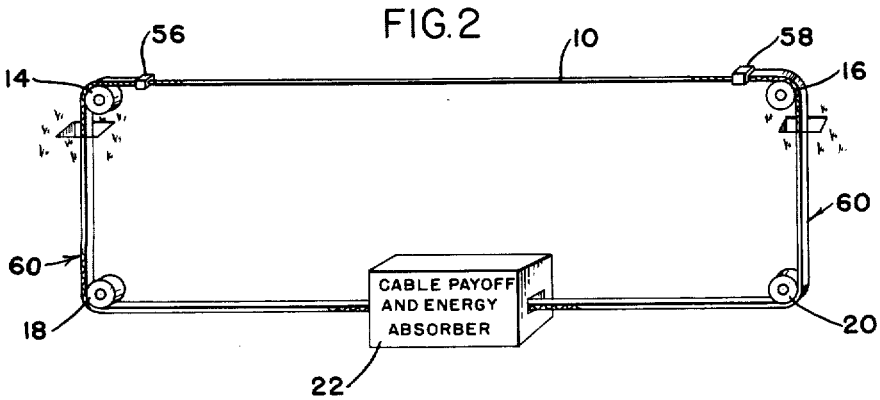
FIGURE 2 is a schematic diagram showing generically the general organization of arresting equipment in which the subject invention is an embodiment.
Figure 6:
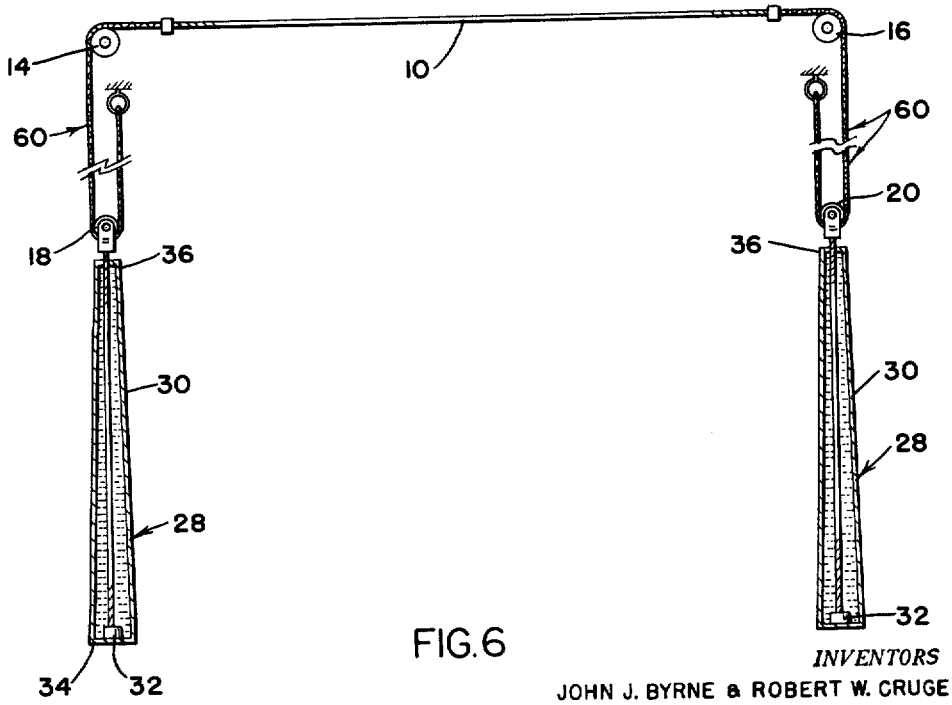
FIGURE 6 is a schematic diagram partially in section of an alternative embodiment of the arresting gear shown in FIGURE 5.

In a modified arrangement from that of FIGURE 2, the tape 60 can be anchored after passing about sheave 18 as shown in FIGURE 6. With a predetermined length of tape, the payout system can be set into motion before the longitudinal wave in the tape proceeds to the anchored end at the fixed member, i.e., as soon as the longitudinal wave reaches the pulley 18, there is force transmitted to the payout means to start the system into motion. Many such arrangements are conceivable, but we consider the most efficient system to comprise that in which the pendant engaging end of the tape is inboard or sheaves 14 and 16.

Our improvement in arresting gear means is also advantageous for off-center engagement. By this is meant engagement of the pendant on either side of its center. It will be readily apparent that when this situation occurs the shorter side of the pendant is stressed considerably higher than the longer side of the pendant. This being the case, the maximum stress of the cable is set up much faster through the transverse wave action described hereinabove than would be the situation if the transverse waves were acting equally from both sides of the pendant. Thus, when an aircraft engages the pendant close to one side, the transverse waves set up on this side of the pendant progress rapidly toward the sheave but is intercepted before making engagement therewith by the synthetic fiber tape which provides the stretch required by the movement of the aircraft at a stress level of about 1/20 that of steel. It can be shown that for the same engagement speed our system can safely accept aircraft engagement three times the distance off-center than is permissible by prior art systems.

Figure 15:
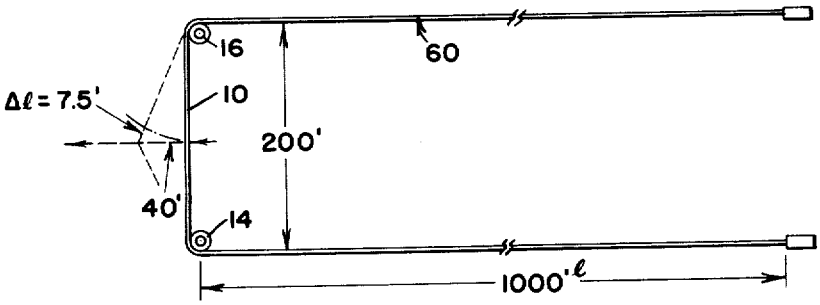
FIGURE 15 is a schematic diagram of an arresting system illustrating pendant strain upon on-center engagement of an aircraft.

Considering now a linear arresting system of finite length and applying the same approach, as set forth hereinabove, a system will be investigated where the length of the system is approximately five times the runway span (see FIGURE 15).

It can be shown that the velocity of the transverse wave is a function of the tension in the system and for wire rope would initially be around 600 f.p.s. for an engaging speed of 200 f.p.s. For example, consider the runway span to be 200 ft., and the length of the system 1000 ft. Since the speed of sound in wire rope is 10,000 f.p.s., the wire rope system can be in motion and provide "feed-in" to reduce the transverse wave impacts in the time it takes the longitudinal wave to travel down the system and back to the runway span (a distance of 2000 ft.) which is approximately .2 sec. Consider that during the .2 sec., the aircraft will travel approximately 40 ft. and will require a "feed-in" of about 7.5 ft. of wire rope which must come from elongation of the wire rope system.

With S representing stress, l the length of the system, $\Delta l$ the change in length of the system, and E the modulus of elasticity for wire rope, then with $$\frac{\Delta l}{l}=\frac{S}{E}$$

$$S=\frac{\Delta l E}{l}=\frac{7.5\times 12.5\times 10^6}{1000}=94{,}000 \text{ p.s.i.}$$

Comparing a nylon system:

$$S \text{ nylon}=\frac{\Delta l E}{l} \text{ where } E=300{,}000$$

$$S \text{ nylon}=\frac{7.5}{1000}\times 300{,}000=2250 \text{ p.s.i. in the same time}$$

However, since feed-in will not occur until .4 sec. (speed of sound in nylon=5000′/sec.) the actual "feed-in" required will be 15′ or 16′, but the stress will still be less than 5000 p.s.i. compared with 94,000 p.s.i. in the wire rope system.

Figure 16:
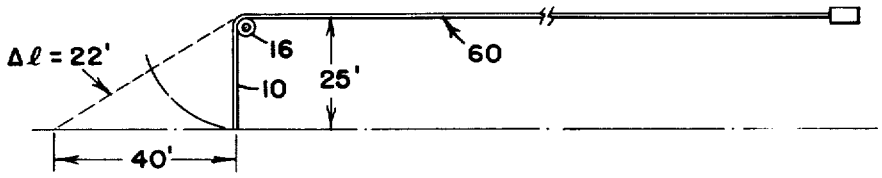
FIGURE 16 is a partial schematic diagram of an arresting system illustrating pendant strain upon off-center engagement of an aircraft.
Figure 8:
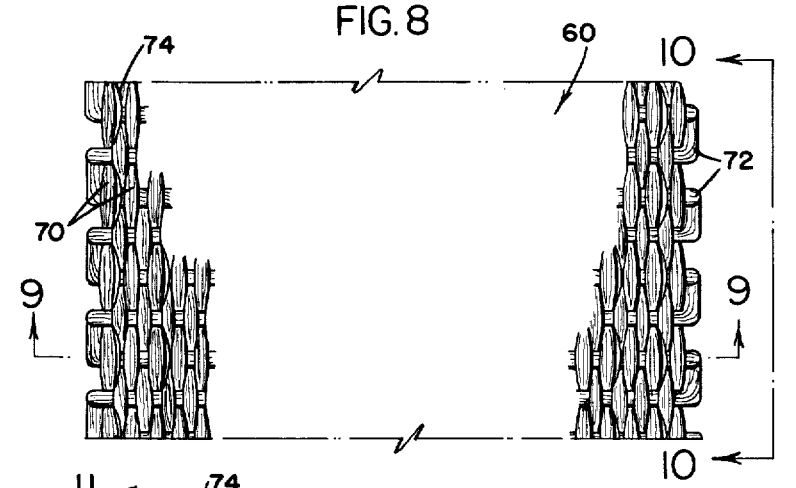
FIGURE 8 is a plan view of a synthetic fiber tape employed in a preferred embodiment of the invention.
Figure 9:
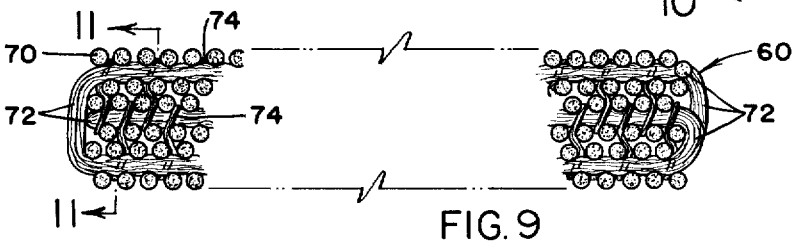
FIGURE 9 is a sectional view taken on the line 9—9 of FIGURE 8.
Figure 10:
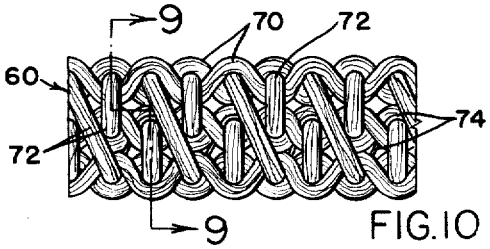
FIGURE 10 is a fragmentary side elevational view taken on the line 10—10 of FIGURE 8.
Figure 11:
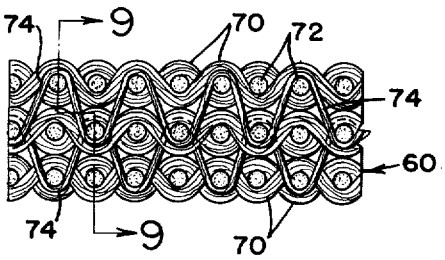
FIGURE 11 is a fragmentary sectional view taken on the line 11—11 of FIGURE 9.

Now assume the same system is engaged off-center about 25 ft. from the sheave 16 (see FIGURE 16). From the simplified geometrical analysis, FIGURE 16, we can see that at the same speed of 200 ft./sec., the required "feed-in" from the near side will be about 22 ft. in the time .2 sec. required to move the 1000 ft. long wire rope system.

The stress for this case would be $$94{,}000\times\frac{22}{7.5} \text{ or } 276{,}000 \text{ p.s.i.}$$

which is obviously too high. As a practical matter a stress of about 150,000 p.s.i. in a wire rope system running over a small radius, e.g., sheaves, hook, or landing gear struts is high enough to cause failure.

Again by comparison the nylon system stress would be only $$\frac{22}{7.5}$$

times the 5000 value or less than 16,000 p.s.i.

In developing this improvement in arresting gear means, we have also developed an article of manufacture which has rendered a practical embodiment of an aircraft arresting system which has heretobefore been only a theoretical possibility. Textile elements have not been employed heretofore as the connection between the center span and the arresting gear energy absorber for various reasons, one of which has been the problem or fear of failure due to abrasion of surface and edge portions. In seeking a woven tape for employment in our arresting gear system, we found we could not use the commercially available weaves. The objection to the commercial available weaves was that all strands were woven transversely to some degree from one side of the tape to the other, and that the strands were of indeterminate length. Even assuming that all of the strands of fiber in the tape were conterminous with the length of the tape per se it still was a fatal defect in design that all strands within a relatively short span of the tape would contribute to form the edge portions of the tape. Thus, if any abrading were to occur on the edges of the tape over a length equal to or greater than the lay of the pattern of the weave; i.e., the distance between similar points on the tape in a repeating pattern, every strand in the tape would be severed, resulting in failure under a very low load and rendering the tape no longer serviceable. Accordingly, we have utilized a weave comprising transverse and longitudinal strands of synthetic fibers wherein each and every longitudinal strand is conterminous with the length of the tape and extends substantially longitudinally thereof, each strand being relatively straight and parallel to each other longitudinal strand. The transverse strands are employed to provide body and shape to the tape and at the same time hold the longitudinal strands in their respective longitudinal relationship one with the other. With this construction, abrading occurring even along the entire length of the tape (and the contemplated lengths of the tapes are in the neighborhood of from 500 to 1,000 feet, and longer), or abrading the edge portions of the tape longer), or abrading of the edge portions of the tape will only reduce the strength of the tape proportionately to the number of individual longitudinal strands which are parted.

Reference is now made to FIGURES 8 through 11 which illustrate the weave of the tape which we have adopted for use in our invention. It will be observed that the tape 60 comprises a plurality of longitudinally aligned load bearing strands 70, transversely bound together by a strand 72 passing from side to side. In addition to the longitudinal strands 70 and the transverse strands 72, smaller longitudinal strands 74 adjacent to longitudinal strands 70 extend longitudinally (FIGURE 8) and from top to bottom of the tape (FIGURES 9 and 11) to lock the top surface of the tape to the bottom surface. Thus, longitudinal strands 70 function as load bearing members in the tape, transverse strands 72, function to hold the tape conformity from side to side, and longitudinal strands 74 function to maintain conformity in the tape from top to bottom.

Figure 12:
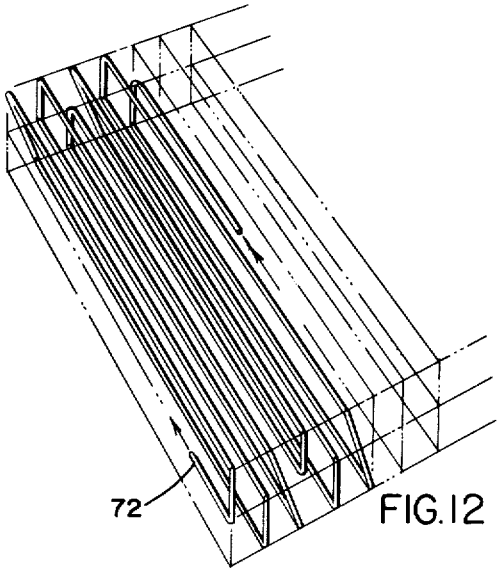
FIGURE 12 is a schematic representation of the pattern of transverse strands employed in the tape of FIGURES 8 through 11.
Figure 13:
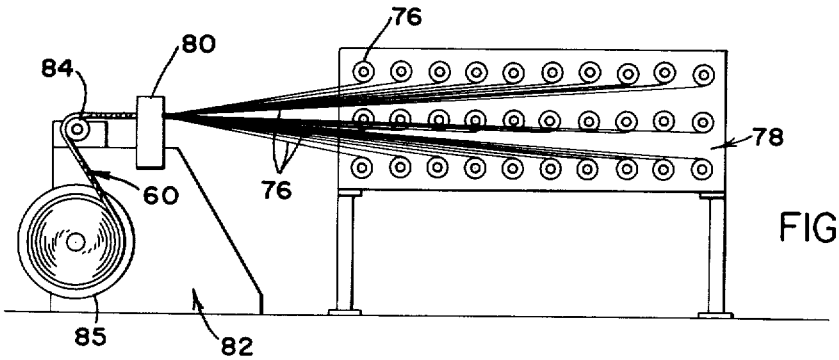
FIGURE 13 is an elevational view of the means to weave the tape of FIGURE 8.
Figure 14:
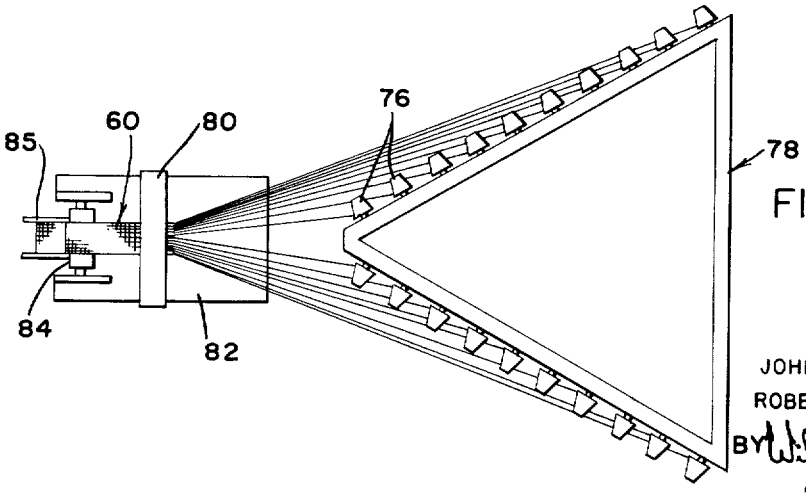
FIGURE 14 is a plan view of the apparatus shown in FIGURE 13.

FIGURE 12 schematically illustrates the path of weave of the transverse tape 72 as it passes from side to side. FIGURES 13 and 14 illustrate the manner in which the tape is woven. It will be seen herein that a plurality of spools of monofilament yarns 76 are mounted on a creel 78 and each strand from each spool is fed into a bobbin assembly 80 mounted on the warper 82. The finished tape 60 passes over an idler roll 84 and is wound on reel 85. The technique of weaving the tape, not being the subject of this invention, will not be discussed in any additional detail inasmuch as these methods are well known to those skilled in the textile arts.

We employ drawn nylon for our tape, but recognize that other synethetic fibers can also be used such as rayon, for instance, and we further recognize that with the rapidly advancing technology of synthetic fibers still other fibers will eventually be developed which may prove to be of even greater utility than nylon. However, a high tensile strength synthetic fiber is required because of its resistance to moisture, rot, mildew, and adverse effects of weather, and because of the superior strengths obtainable in synthetic fibers over those natural fibers.

Accordingly, with the arrangement of a synthetic tape as described hereinabove, and in particular the embodiment of a tape of the design which we have chosen, we have been able to provide an improvement in an arresting gear means which will enable the arrestment of aircraft landing at much greater speeds than has heretofore been possible.

It is to be understood that whereas several embodiments of the invention have been described hereinabove, these embodiments are by way of example only and are not to be construed in a limiting sense. Other arrangements and modifications will occur to those skilled in the art upon reading the specification and the attached claims, and examining the included drawings, said other arrangements and modifications being within the spirit and scope of the invention.

We claim:

1. In an aircraft arresting device including a runway pendant, a sheave on each side of said pendant, [an] energy absorber *means,* and pendant payout means, said energy absorber *means being* connected to said pendant payout means, the improvement comprising: a woven tape of synthetic fibers [connected at each end of said pendant to pass over said sheaves and to engage said payout means,] *placed in tension between each end of said pendant and said pendant payout means by which arrangement there is imposed on said tape a longitudinal stress wave caused by transverse impact of said aircraft against said pendant to actuate said payout means and said energy absorber means, short lengths of said tape extending from said sheaves to the ends of said pendant transverse to the direction of impact of said aircraft on said pendant, said short lengths of said tape serving to intercept and damp pendant destructive transverse waves set up in said pendant by said aircraft impact, wherein reflection of said transverse waves from said sheaves toward the point of impact in said pendant is retarded.*

2. In an aircraft arresting device including a runway pendant, [a sheave] *positioning means* on each side of said pendant, and an energy absorber, the improvement comprising: a *tensioned* woven tape of synthetic fibers connected at each end of said pendant to pass over said [sheaves] *positioning means at right angles to the path of arrestment of an aircraft* and to engage said energy absorber, the synthetic fibers of said tape being formed into longitudinal and transverse strands, each longitudinal strand extending from said pendant to said energy absorber.

3. In an arresting device of the class described including deck sheaves positioned on opposite sides of a runway, *and energy absorbing means,* the improvement comprising: non-metallic tape characterized by a modulus of elasticity *substantially* less than steel wire rope, *a steel wire rope pendant positioned on said runway in alignment with said sheaves and transverse to the path of impact engagement of an aircraft with said pendant,* said tape being positioned about said sheaves to provide connections *in tension* to each end of the steel wire rope pendant engaging means and to *said* energy absorbing means, *by which arrangement a longitudinal stress wave imposed on said tape, caused by transverse impact of said aircraft against said pendant, actuates said energy absorbing means, and the portions of said tape in tension between the ends of said pendant and said sheaves* [whereby said tape] absorbs *pendant destructive* transverse wave impact at said deck sheaves.

4. In an aircraft arresting device including a runway steel cable pendant extending transversely across the runway, [a sheave] *positioning means* on each side of said runway in line with an adjacent end of said pendant, and an energy absorber positioned clear of said runway, the improvement comprising: a *tensioned* woven tape of synthetic fibers in line with and connected at each end of said pendant to extend transversely with respect to said runway, thereafter to pass over said [sheaves] *positioning means* and to extend to said energy absorber for engagement therewith, the synthetic fibers of said tape being formed into longitudinal and transverse strands, and each longitudinal strand extending from said pendant to said energy absorber, whereby transverse waves imparted to said pendant by engagement of an aircraft therewith are *damped* [dampened] by the transverse portions of said tape intermediate said pendant and [said sheaves] *positioning means.*

*5. In an aircraft arresting device including a runway pendant having a high modulus of elasticity, and energy absorber means, the improvement comprising: woven tape means of synthetic fibers having a low modulus of elasticity relative to said pendant and secured to the ends thereof, the synthetic fibers of said tape means being formed into longitudinal and transverse strands, each longitudinal strand extending from said pendant to said energy absorber means, said energy absorber means including tape positioning and guiding means located transversely on opposite sides of a runway, for receiving said tape means thereabout and tensioning the same by which arrangement a longitudinal stress wave imposed on said longitudinal strands, caused by transverse impact of an aircraft against said pendant, actuates said energy absorber means to permit controlled payout of said tape means to relieve stress in said pendant, the portions of said tape means between said positioning and guiding means and the ends of said pendant extending transverse to the direction of impact of said aircraft on said pendant, said tape portions serving to intercept and damp pendant destructive transverse waves created in said pendant by said aircraft impact, and further serving to provide required stretch when said aircraft makes an offside engagement of said pendant.*

*6. An aircraft arresting device of the class described comprising: a high modulus of elasticity, aircraft arresting pendant member positioned transversely across an aircraft runway; a payout energy absorber; a payout energy absorber transmission member in the nature of a woven tape of synethetic fibers having a low modulus of elasticity as compared to said pendant, the synthetic fibers of said tape being formed into longitudinal and transverse strands; tape positioning and guiding means on opposite sides of said runway in line with adjacent ends of said pendant, said tape longitudinal strands being*

*unbroken, load transferring monofilaments in tension between said ends of said pendant and said payout energy absorber, said tape extending in tension transversely with respect to said runway from said pendant ends to said positioning and guiding means by which arrangement a longitudinal wave imparted to said pendant by impact of an aircraft is transmitted by the load transferring longitudinal monofilament strands of said tape to said payout energy absorber to actuate same, and a pendant destructive transverse wave imparted to said pendant by said impact is intercepted and damped by the portions of said tape extending transversely between said pendant ends and said tape positioning and guiding means, said transverse portions also serving to provide required proportional stretch when said aircraft engages said pendant on center or to one side of center.*

*7. In an aircraft arresting device of the class described including a runway pendant having a high modulus of elasticity, pendant positioning means on opposite sides of the runway, and a payout energy absorber, the improvement comprising: single means to simultaneously provide longitudinal load transmission, stretch for off-center engagement, and pendant transverse wave decay, said means including a low modulus of elasticity woven tape of synthetic fibers, said fibers being formed into load transmitting monofilament longitudinal strands coterminous with the length of the tape, each longitudinal strand being relatively straight and parallel to each other longitudinal strand, and transverse strands adapted to provide body and shape to said tape and to hold said longitudinal strands in their respective longitudinal relationship one with the other, said tape being secured to each end of said pendant in tension to extend transversely across said runway between said pendant ends and said pendant positioning means, and thereafter being connected in tension to said payout energy absorber, whereby the impact of an aircraft with said pendant imposes longitudinal and transverse stress waves on said tape and stretches that portion of tape transverse to the runway closest to the point of impact a greater amount than the transverse portion of tape remote from said point of impact, said tape transmitting said longitudinal stress wave to acuate said payout energy absorber and substantially simultaneously intercepting said transverse wave before making destructive impact against said pendant positioning means.*

*8. Aircraft arresting apparatus comprising in combination a coacting system of payout and energy absorbing means, a high modulus of elasticity runway pendant, a low modulus of elasticity woven tape of synthetic fibers stretched between said pendant and said payout and energy absorbing means, and means for stretching said pendant across and adjacent to the runway surface at substantially right angles to the aircraft direction of approach and for engagement by a lower part of the aircraft, said last named means including tape positioning and guiding means located at opposite sides of the runway, there being short lengths of said tape extending into each side of said runway from said positioning and guiding means to the ends of said pendant, the arrangement of said tape and said pendant providing for the imposing of a longitudinal stress wave on said tape substantially at the instant of impact of the aircraft against said pendant, said longitudinal stress wave being utilized to actuate said payout and energy absorber to provide controlled feeding of additional tape between said tape positioning and guiding means, said short lengths of tape which extend at right angles to said runway serving to provide required stretch to said system until said payout and energy absorber is actuated, and said short lengths of tape further serving to intercept and prevent pendant destructive transverse wave reflection from said positioning and guiding means.*

*9. An aircraft arresting apparatus comprising a runway cable pendant having two ends and lengths of woven tape of synthetic fibers connected to said ends of said pendant, said tape having a modulus of elasticity appreciably lower than said pendant, and a payout energy absorbing system including tape positioning and guiding means located at opposite sides of a runway, said tape extending to said payout energy absorbing system and being connected thereto, said tape being further adapted for stretching said pendant across and adjacent to the runway surface at substantially right angles to the lengthwise direction of said runway for engagement by a lower part of an aircraft to be arrested; short lengths of said tape being arranged to extend from said positioning and guiding means to said ends of said pendant, the arrangement of said tape and pendant being such that the impact of said aircraft against said pendant imposes longitudinal and transverse stress waves on said tape substantially at the instant of said impact, whereby the demands set up in said pendant for stretch, first supplied in part by said pendant, is transmitted by said longitudinal stress waves to said tape before said transverse waves reach said tape positioning and guiding means, thereby relieving said stress in said pendant, and thereafter continuing to supply stretch at the demanded rate per second required in said pendant in order to keep imposed stress and strain on said pendant within safe limits, said tape providing substantially all of the necessary stretch in the payout system while at the same time transmitting said longitudinal stress wave to said payout energy absorbing system to place the same in motion before the maximum stress capacity of said tape is exceeded, said short lengths of tape further providing differential stretch on opposite sides of said pendant proportional to the degree an arrestment is made to one side of center of said pendant.*

References Cited in the file of this patent or the original patent

UNITED STATES PATENTS

| | | |
|---|---|---|
| 906,463 | Sarafian | Dec. 8, 1908 |
| 2,450,328 | Cotton | Sept. 28, 1948 |
| 2,712,912 | Hattan | July 12, 1955 |
| 2,788,023 | Renaud | Apr. 9, 1957 |

FOREIGN PATENTS

| | | |
|---|---|---|
| 1,154,819 | France | Nov. 12, 1957 |

OTHER REFERENCES

Aviation Week, December 10, 1956, p. 34.

Aviation Week, September 23, 1957, pp. 86, 87, 89, 91, 93, 95, 97, 99.